(12) United States Patent
Yang et al.

(10) Patent No.: US 9,464,721 B2
(45) Date of Patent: Oct. 11, 2016

(54) GATE VALVE WITH SECURE SEALING MECHANISM

(71) Applicant: KING LAI HYGIENIC MATERIALS CO., LTD, Hsinchu County (TW)

(72) Inventors: Li-Chuan Yang, Hsinchu County (TW); Shu-Mei Huang, Hsinchu County (TW)

(73) Assignee: KING LAI HYGIENIC MATERIAL CO., LTD, Zhubei, Hsinchu County (TW)

( * ) Notice: Subject to any disclaimer, the term of this patent is extended or adjusted under 35 U.S.C. 154(b) by 79 days.

(21) Appl. No.: 14/629,280

(22) Filed: Feb. 23, 2015

(65) Prior Publication Data

US 2016/0245412 A1  Aug. 25, 2016

(51) Int. Cl.
| | |
|---|---|
| *F16K 1/16* | (2006.01) |
| *F16K 31/44* | (2006.01) |
| *F16K 3/00* | (2006.01) |
| *F16K 25/00* | (2006.01) |
| *F16K 3/02* | (2006.01) |

(52) U.S. Cl.
CPC ........... *F16K 3/0254* (2013.01); *F16K 3/0218* (2013.01); *F16K 3/0227* (2013.01); *F16K 3/0281* (2013.01); *F16K 31/44* (2013.01)

(58) Field of Classification Search
CPC .. F16K 3/0218; F16K 3/0227; F16K 3/0281; F16K 31/44

USPC ........ 251/299, 231, 326, 251, 203; 141/458, 141/263, 264, 280; 74/25

See application file for complete search history.

(56) References Cited

U.S. PATENT DOCUMENTS

| | | | | |
|---|---|---|---|---|
| 1,133,978 | A | * 3/1915 | Leask | ....................... F23K 3/00 110/118 |
| 3,605,825 | A | * 9/1971 | Hermes | ................. B30B 15/304 141/1 |
| 4,605,198 | A | * 8/1986 | Greiner | ..................... F16K 1/24 251/229 |
| 4,718,637 | A | * 1/1988 | Contin | ................. F16J 15/0881 251/158 |
| 7,341,237 | B2 | 3/2008 | Bösch | |

* cited by examiner

*Primary Examiner* — Kevin Murphy
*Assistant Examiner* — Kelsey Rohman
(74) *Attorney, Agent, or Firm* — Muncy, Geissler, Olds & Lowe, P.C.

(57) ABSTRACT

A gate valve with secure sealing mechanism includes a main body having a valve opening, a driver disposed on the main body, a sliding seat slidingly disposed in the main body, a swing arm, and a valve member. Therein, two ends of the swing arm are connected to the driver and the sliding seat, respectively, whereby the driver drives the swing arm to move circularly between a first and second position, thereby triggering the sliding seat to slide. When the swing arm is at the first or second position, the swing arm is biased against the route direction of the sliding seat. The valve member is disposed on the sliding seat for moving in parallel or vertical to the valve opening, thereby preventing the sliding seat from swaying when the swing arm is at the first or second locking position.

18 Claims, 10 Drawing Sheets

GATE VALVE WITH SECURE SEALING MECHANISM

BACKGROUND OF THE INVENTION

1. Field of the Invention

The present invention relates to gate valves, and more particularly, to a gate valve with secure sealing mechanism.

2. Description of the Related Art

U.S. Pat. No. 7,341,237 discloses a valve mechanism for optionally sealing or opening a valve opening in a casing, while the valve opening is provided with a seat surface. Therein, the valve mechanism comprises at least a valve member capable of moving in parallel or vertical to the seat surface of the valve opening in the casing. A driving board is disposed in the casing and connected to at least a valve member, wherein the driving board is able to move horizontally, such that the valve member is driven to move horizontally.

The valve mechanism aforementioned is able to drive the valve member to move horizontally or vertically by use of the driving board, thereby sealing the valve opening. However, the valve mechanism is not provided with any locking devices or secure mechanisms for stably securing the valve member at the sealing position, such that the driving board is easily shifted or displaced. As a result, the valve member is hindered from effectively sealing the valve opening. In a more serious environment, fluid tends to be leak out from the valve opening, causing unnecessary loss.

SUMMARY OF THE INVENTION

For improving aforementioned issues, the present invention discloses a gate valve with secure sealing mechanism, which applies non-linear driving track for a rolling member of a swing arm to circularly move, so as to drive a sliding seat to slide, whereby a valve member seals the valve opening of the main body. Also, when the swing arm is at a first or second position, the swing arm is biased against the route direction of the sliding seat. As a result, the sliding seat is prevented from swaying due to external force, thereby assuring the valve opening is securely sealed when the swing arm is at the second position.

For achieving the objective above, the present invention provides a gate valve with secure sealing mechanism, comprising:

a main body, provided with a valve opening;
a driver, disposed on the main body;
a sliding seat, slidingly disposed in the main body;
a swing arm, with one end thereof connected to the driver and the other end thereof connected to the sliding seat, such that the driver drives the swing arm to circularly move between a first position and a second position, so as to trigger the sliding seat to slide, wherein when the swing arm is at the first or second position, the swing arm is biased against a route direction of the sliding seat;
a valve member, disposed on the sliding seat for moving in parallel or vertical to the valve opening,
such that the sliding seat is prevented from swaying when the swing arm is at the first or second position, and the valve opening is stably sealed when the swing arm is at the second position.

Preferably, the sliding seat is provided with a driving groove having a non-linear driving track, while one end of the swing arm is provided with a rolling member placed in the driving groove and capable of circularly moving along the driving track, such that the sliding seat reciprocates between two ends of the main body.

Preferably, the driver of the present invention is disposed on the main body and manually operated.

Preferably, the driving track of the present invention includes a first driving section, a second driving section, and a third driving section. The second driving section is inclinedly connected between the first driving section and the third driving section, such that when the rolling member moves from the first driving section to the second driving section, the valve member perpendicularly moves against the valve opening for sealing the valve opening.

Preferably, the sliding seat of the present invention includes two first guiding portions disposed in parallel with each other, and the valve member has two second guiding portions. Furthermore, the first guiding portion has at least one connecting groove, while the second guiding portion has at least one matching groove oppositely disposed in relation to the connecting groove. Plural circular rods pass through the connecting groove and the connecting groove, such that the connecting groove overlaps and cooperates with the matching groove. Therefore, the valve member is stably controlled to move against the sliding seat, thereby sealing the valve opening.

DETAILED DESCRIPTION OF THE INVENTION

Figure 1:
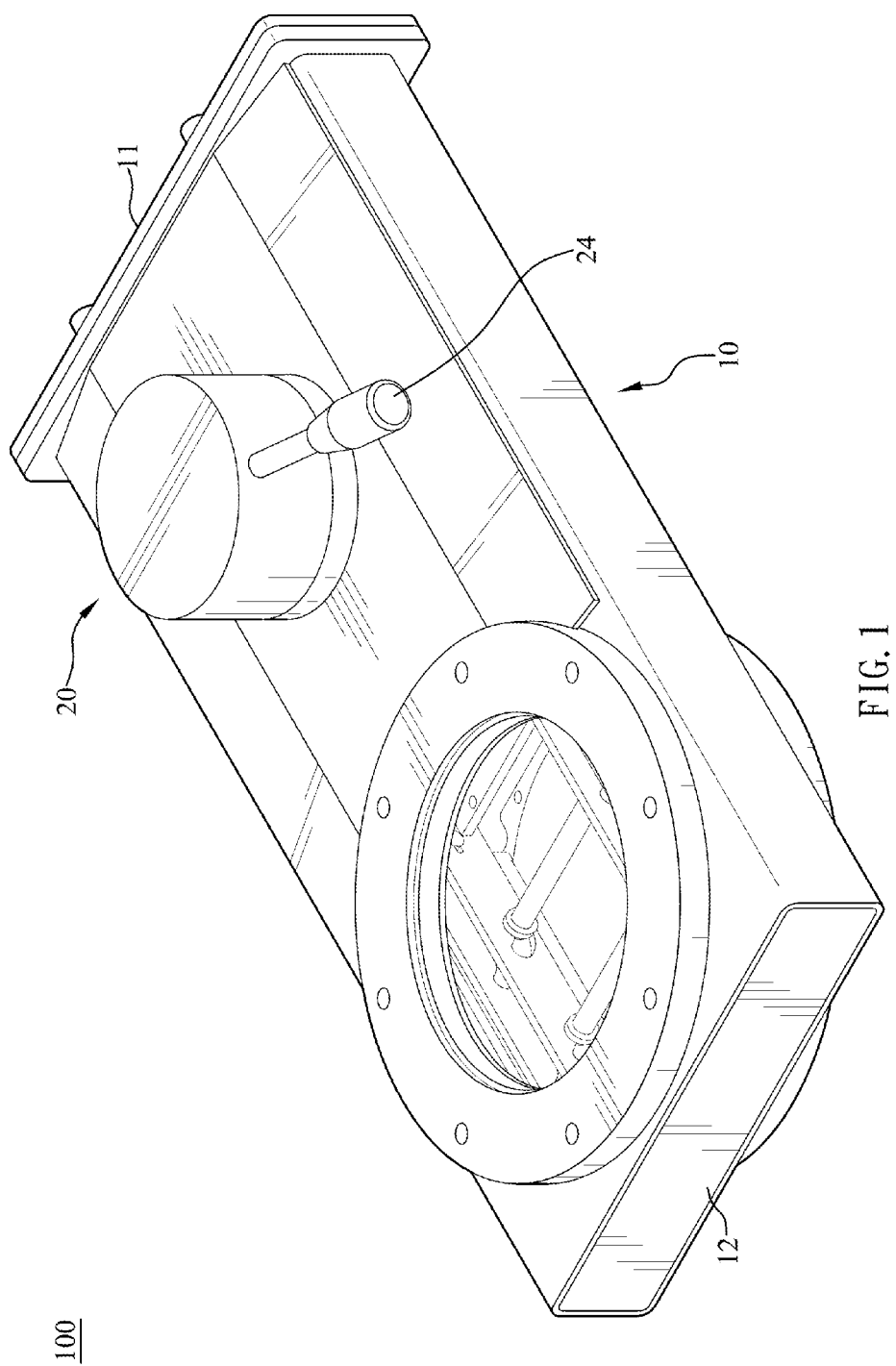
FIG. 1 is a perspective view of the gate valve in accordance with the present invention.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 9, the present invention provides a gate valve with secure sealing mechanism 100, comprising a main body 10, a driver 20, a sliding seat 30, a swing arm 40, and a valve member 50. Therein, the main body 10 is hollow and provided with a first end 11 and a second end 12. The second end 12 has a valve opening 13 disposed on a lateral side thereof. The driver 20 drives the swing arm 40 to rotate, so as to trigger the sliding seat 30 to reciprocate along the direction in accordance with the arrowhead A in FIG. 2, whereby the valve member 50 seals the valve opening 13.

The main body 10 is provided with two guiding planks 14 disposed on two sides of the inner edge thereof, respectively, and a positioning groove 15 is disposed on the guiding plank 14 adjacent to the valve opening 13. Also, the positioning groove 15 is provided with a curved portion 151 and a distal portion 152.

Figure 4:
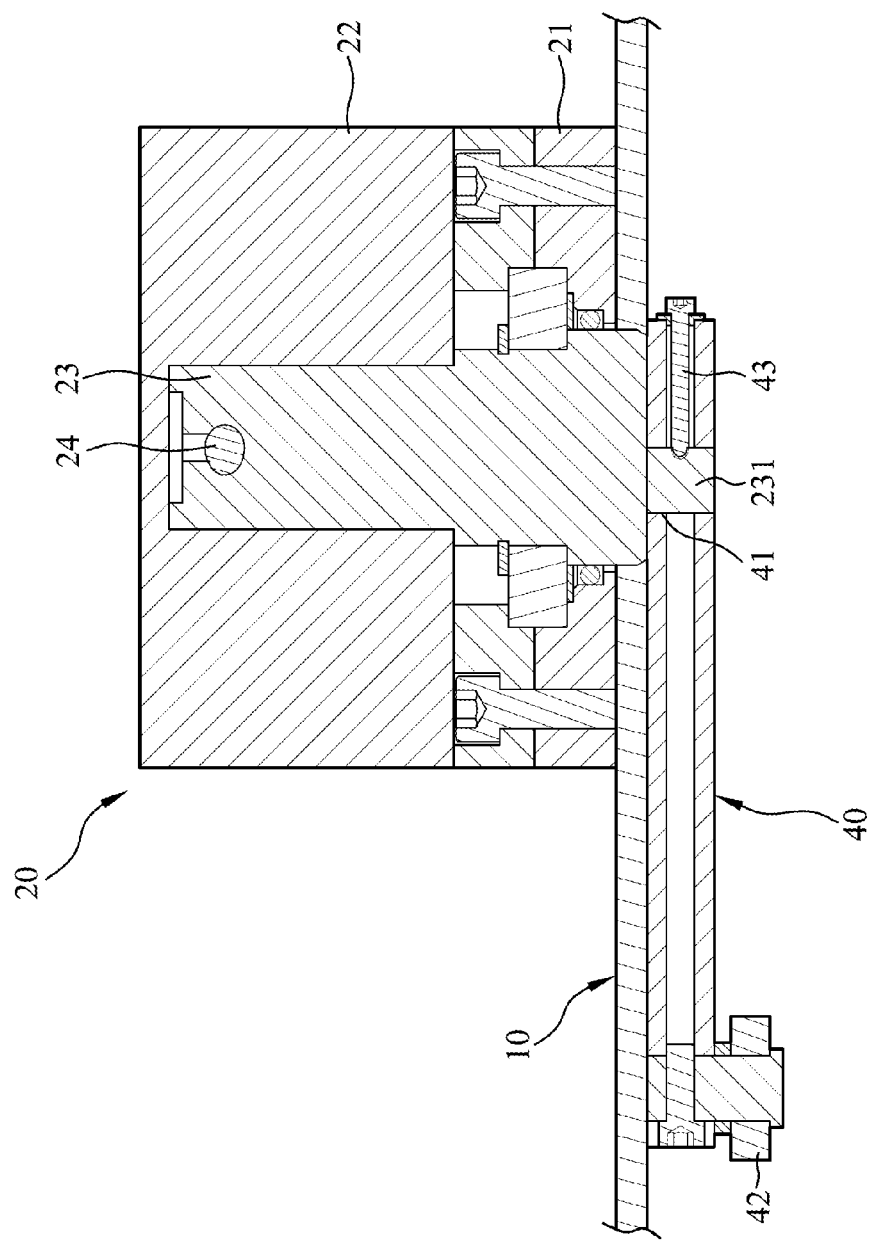
FIG. 4 is a schematic view illustrating the status of the driver connected with the swing arm in accordance with the present invention.

The driver 20 is disposed on the main body 10, as shown in FIG. 4. In the preferred embodiment, the driver 20 is rotatable disposed on the main body 10 and operated manually. Also, the driver 20 is allowed to be driven pneumatically. Further, the driver 20 comprises a fixing portion 21, an acting portion 22, a rotary shaft 23, and an operation rod 24. The fixing portion 21 is fixed on the top of the main body 10, and the acting portion 22 is rotatable disposed on the fixing portion 21. The rotary shaft 23 is mounted with a bearing and thereby longitudinally disposed between the acting portion 22 and the fixing portion 21, with one end of the rotary shaft 23 inserted into the main body 10. The operation rod 24 passes through the acting portion 22 and the rotary shaft 23; in the preferred embodiment, the operation rod 24 is screwed to the rotary shaft 23 for driving the rotary shaft 23 to rotate. In addition, one block 231 is disposed on the end of the rotary shaft 23 for engaging the swing arm 40, such that the driver 20 drives the swing arm 40 to work.

The sliding seat 30 is slidingly disposed in the main body 10, with one end thereof transversely provided with a driving groove 31. The driving groove 31 defines a nonlinear driving track 32, while the driving track 32 comprises a first driving section 321, a second driving section 322, and a third driving section 323. Therein, the second driving section 322 is inclinedly connected between the first driving section 321 and the third driving section 323. End parts of the first driving section 321 and the third driving section 323 are both in an arc shape. Four corners of the sliding seat 30 is provided with a first roller 33, respectively, for rollingly contacting the inner lateral sides of the two guiding planks 14.

Figure 8C:
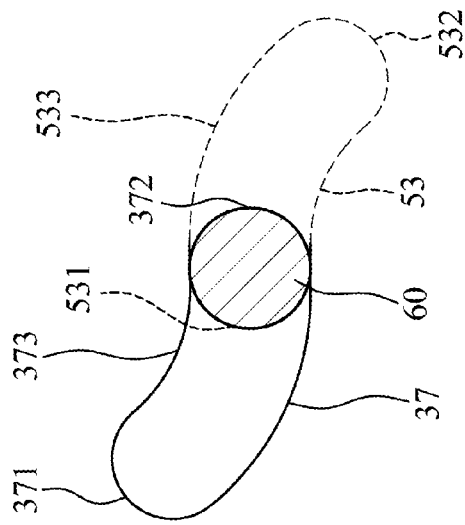
FIG. 8A to FIG. 8C are schematic views illustrating the relative displacements between the connecting groove and the matching groove.
Figure 8B:
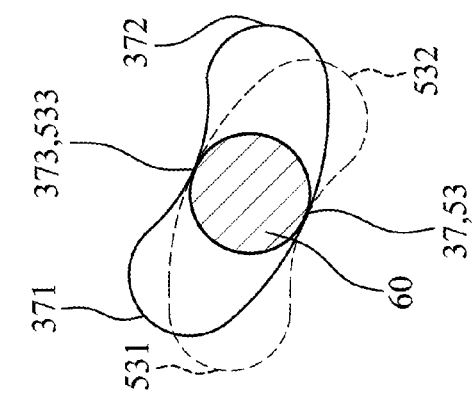
Figure 8A:
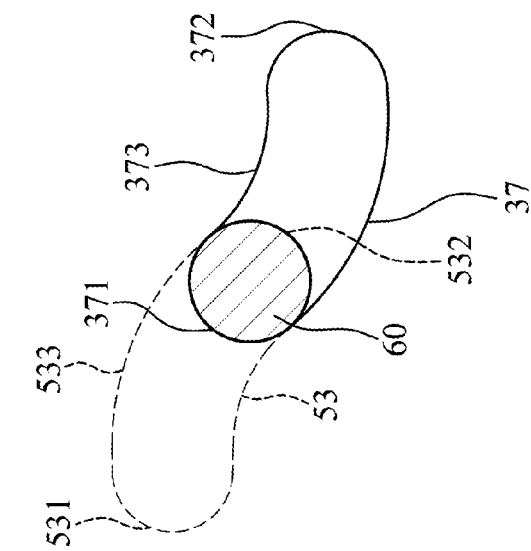

One hollow portion 34 is disposed on the sliding seat 30 adjacent the driving groove 31, with two first guiding portions 35 fixed in parallel on the hollow portion 34. Therein, the first guiding portion 35 is formed of two first planks 36 which are disposed in parallel with a certain spacing therebetween, while each of the two first planks 36 is provided with two connecting grooves 37, such that the connecting groove 37 on each of the two first planks 36 are symmetrically disposed. Therein, each of the connecting grooves 37 has a first end 371 and a second end 372, with a bias section 373 disposed therebetween, as shown in FIG. 8A to FIG. 8C.

Furthermore, two ends of the first guiding portion 35 of the sliding seat 30 are provided with a second roller 38, respectively, for rollingly contacting the inner face of the main body 10 on one side in opposite to the valve opening 13. Therein, one of the second rollers 38 on the first guiding portion 35 is disposed between the two first planks 36, while the other second roller 38 on the other end thereof is disposed on the outer first plank 36 of the two first planks 36.

Figure 6:
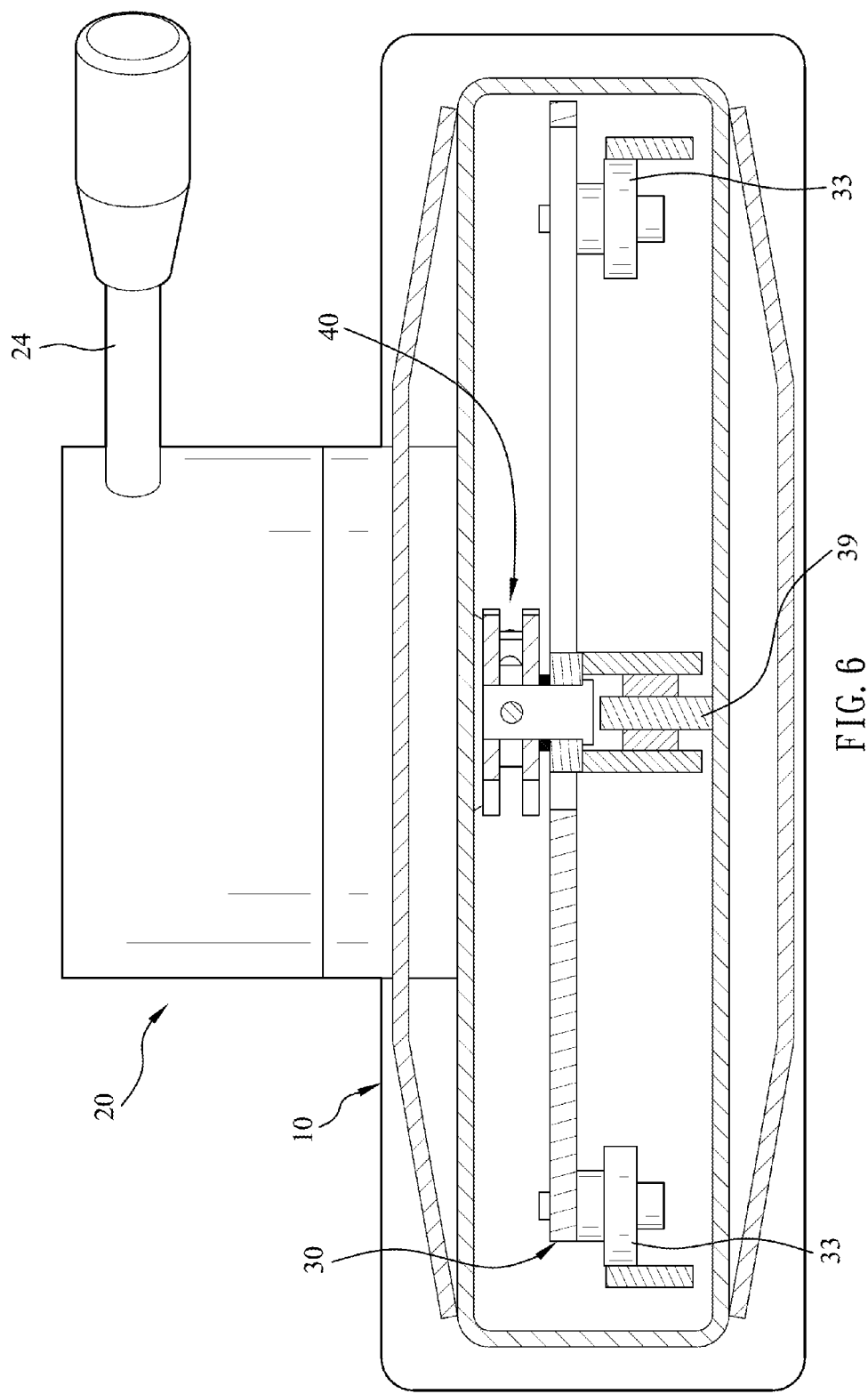
FIG. 6 is a horizontal sectional schematic view illustrating the status of the sliding seat contacted with the main body.
Figure 7:
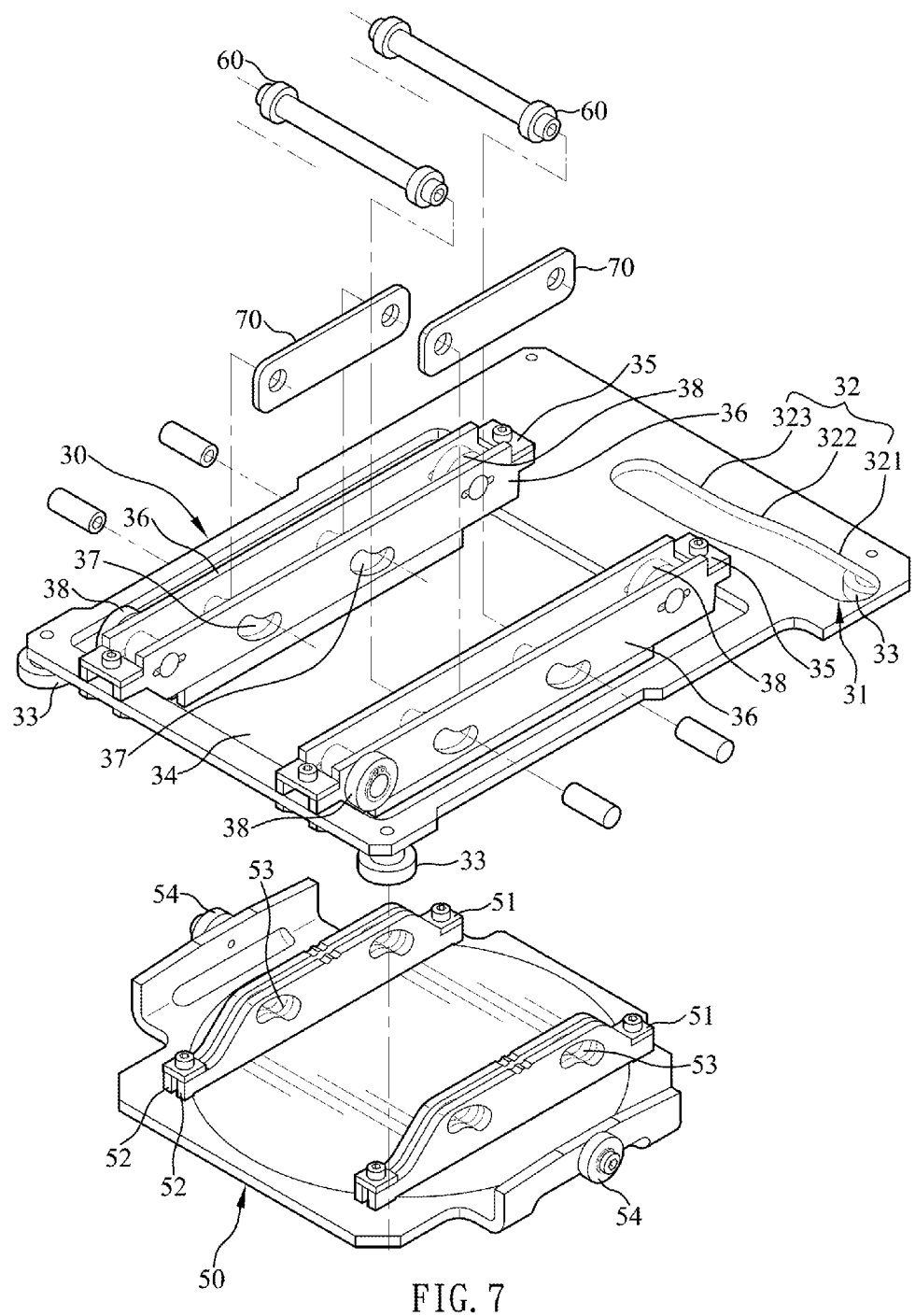
FIG. 7 is an exploded view of the sliding seat and the valve member in accordance with the present invention.

Further, one end of the sliding seat 30 adjacent to the driving groove 31 is provided with a guiding wheel 39 for contacting the inner face of the main body 10 on one side provided with the valve opening 13, as shown in FIG. 6. Through the configuration of the first roller 33 with the second roller 38 and the guiding wheel 39, the sliding seat 30 is allowed to slide in the main body 10.

The swing arm 40 is provided with an engaging hole 41 on one end thereof and a rolling member 42 on the other end thereof, so as to be placed in the driving groove 31. The engaging hole 41 of the swing arm 40 is applied for engaging and fixing the block 231 of the rotary shaft 23, and a fastening member 43 is transversely fastened to the engaging hole 41 and the block 231. Therein, the swing arm 40 is formed of two planks, and the fastening member 43 is allowed to be fastened to the two planks, thereby fixing the swing arm 40. Thus, the driver 20 is able to drive the swing arm 40 to circularly move by use of the rolling member 42 along the driving track 32 between the first end 11 and the second end 12. Especially, when the swing arm 40 is at the first position or the second position, the swing arm 40 is biased against the route direction of the sliding seat 30; meanwhile, the rolling member 42 is constantly placed at the end part of the third driving section 323 when the swing arm 40 is at either the first position or the second position, as shown in FIG. 9A to FIG. 9D, wherein the arrowhead B defines the biased direction of the swing arm 40.

The valve member 50 is disposed on the sliding seat 30 or moving in parallel or vertical to the valve opening 13. The valve member 50 is provided with two second guiding portions 51 which are coupled with the first guiding portions 35, so as to seal the valve opening 13 by a linkage structure. Preferably, structures of the second guiding portions 51 and the first guiding portions 35 are similar. Each of the second guiding portions 51 is formed of two second planks 52 disposed with a certain spacing therebetween, and each of the second plank 52 is provided with two matching grooves 53, while the matching grooves 53 are in an identical shape with the connecting grooves 37 but reversely disposed in relation to the connecting grooves 37. Also, each of the matching grooves 53 is provided with a first end 531, a second end 532, and a bias section 533 between the first end 531 and the second end 532, as shown in FIG. 8A to FIG. 8C. Each couple of the second planks 52 is disposed between a couple of the first planks 36, and a linkage plank 70 is disposed between each couple of the second planks 52. A guiding roller 54 is disposed on two sides of the valve member 50, respectively, for rollingly contacting the corresponding guiding plank 14.

Figure 5:
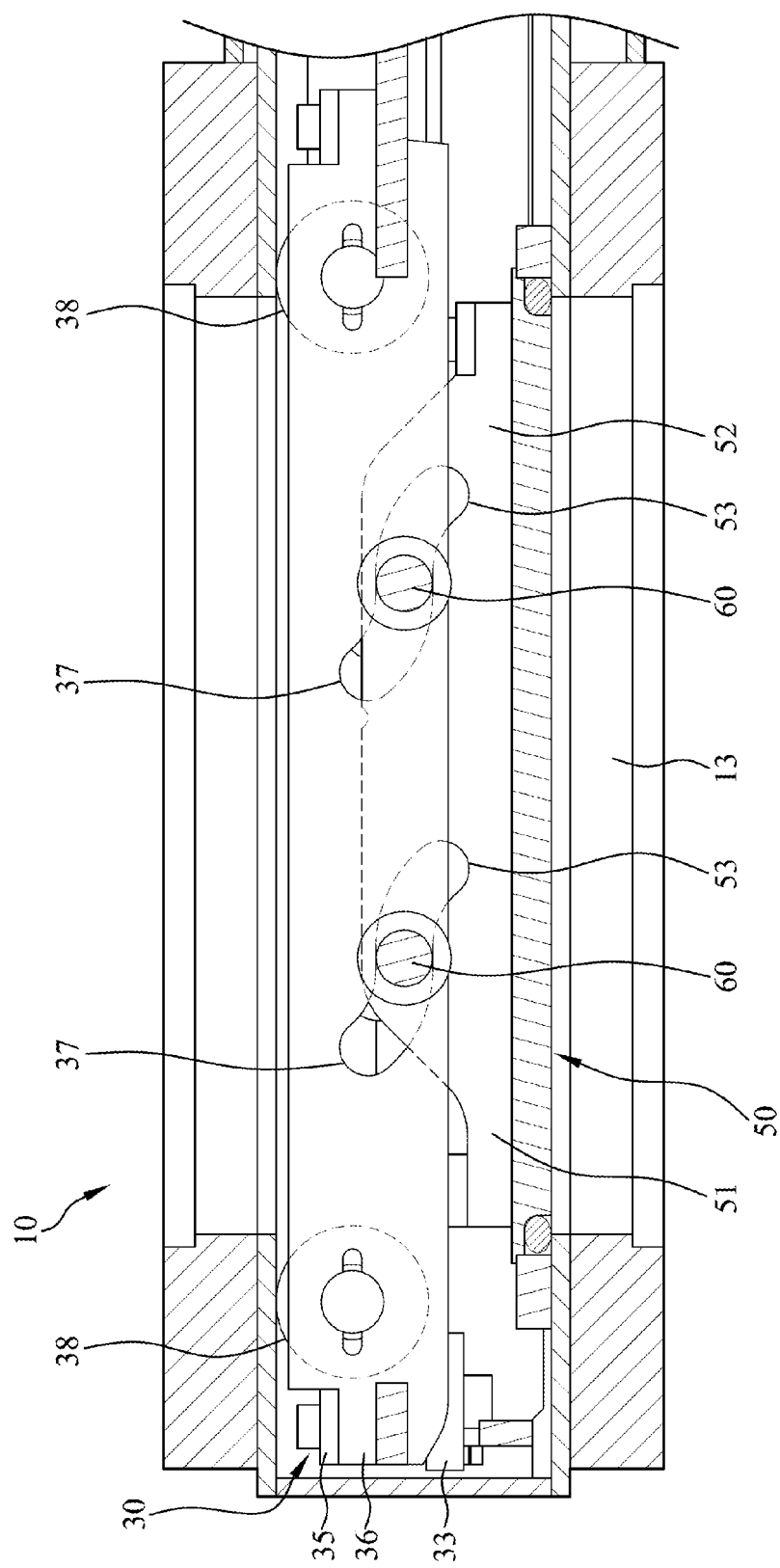
FIG. 5 is a sectional schematic view illustrating the valve opening sealed by the valve member in accordance with the present invention.

Plural circular rods 60 are disposed to pass through related connecting grooves 37, matching grooves 53, and the linkage planks 70, respectively, such that the connecting groove 37 overlaps and cooperates with the matching groove 53, while each of the circular rods 60 is allowed to synchronously move by use of the linkage planks 70. Therein, when the rolling member 42 of the swing arm 40 moves to the second driving section 322 in the driving groove 31, the guiding roller 54 enters the curved portion 151 of the positioning groove 15. In addition, the valve member 50 is allowed to move in vertical to the valve opening 13 due to the linkage mechanism between the first guiding portion 35 and the second guiding portion 51. Also, when the rolling member 42 of the swing arm 40 moves to the third driving section 323 of the driving groove 31, the guiding roller 54 enters the distal portion 152 of the positioning groove 15, such that the valve member 50 stably and tightly seal the valve opening 13, as shown in FIG. 5.

FIG. 8A, FIG. 8B, and FIG. 8C illustrate the route of the circular rod 60 moving in the connecting groove 37 and the matching groove 53. Referring to FIG. 8A, with the corresponding connecting groove 37 and the matching groove 53, the circular rod 60 is placed in an overlapping area of the first end 371 of the connecting groove 37 and the second end 532 of the matching groove 53. The circular rod 60 is limited by the arc-shaped ends of the connecting groove 37 and the matching groove 53, such that the sliding seat 30 remains in a stop status and is thereby prevented from swaying.

Figure 2:
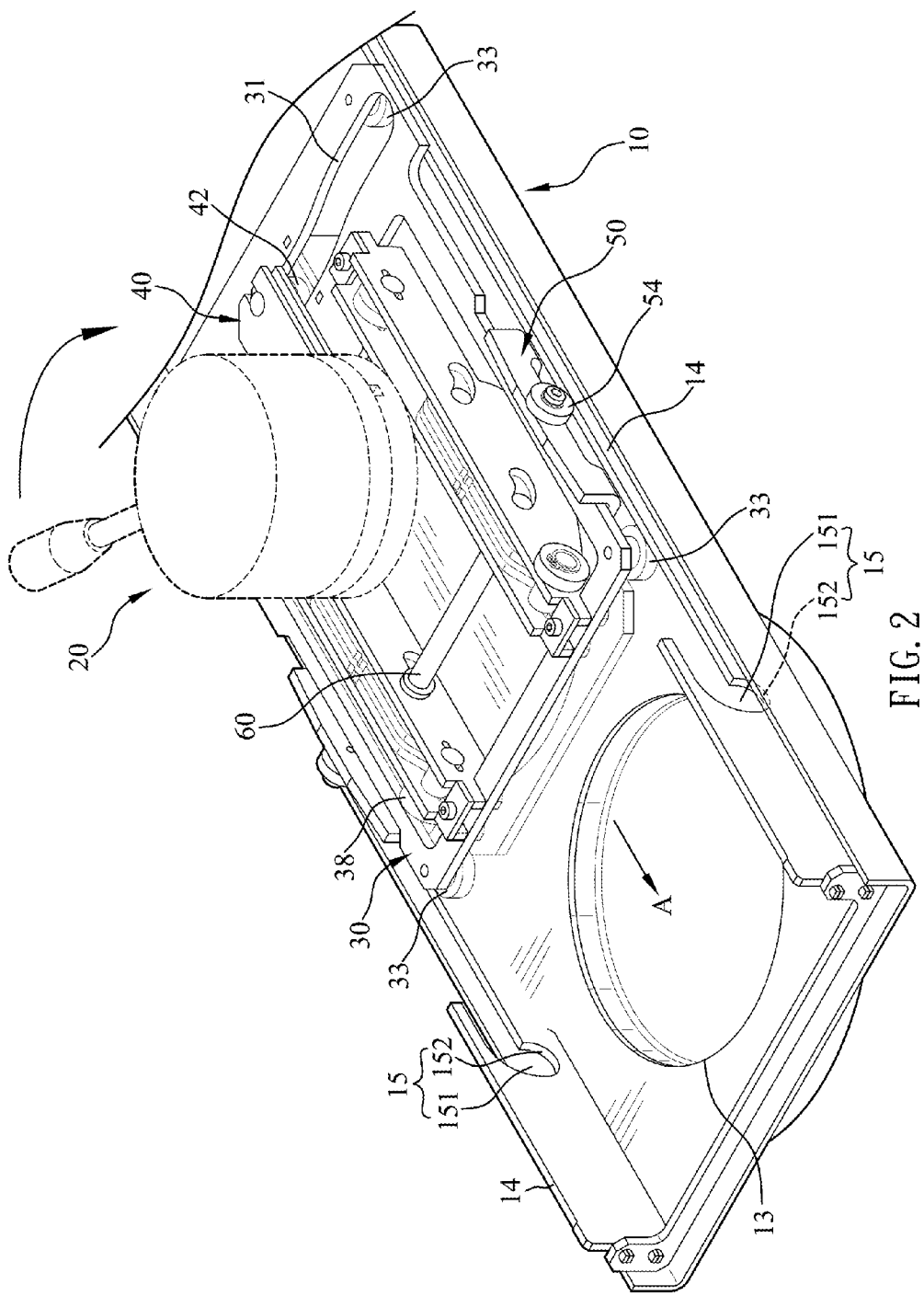
FIG. 2 is an internal schematic view illustrating the sliding seat at the first end in accordance with the present invention

Referring to FIG. 8B, when the sliding seat 30 horizontally moves along the direction defined by the arrowhead A (as shown in FIG. 2), a linkage effect is produced among the connecting groove 37, the matching groove 53, and the circular rod 60 until the guiding roller 54 enters the distal portion 152 of the positioning groove 15, such that the valve member 50 vertically moves toward the valve opening 13.

Figure 3:
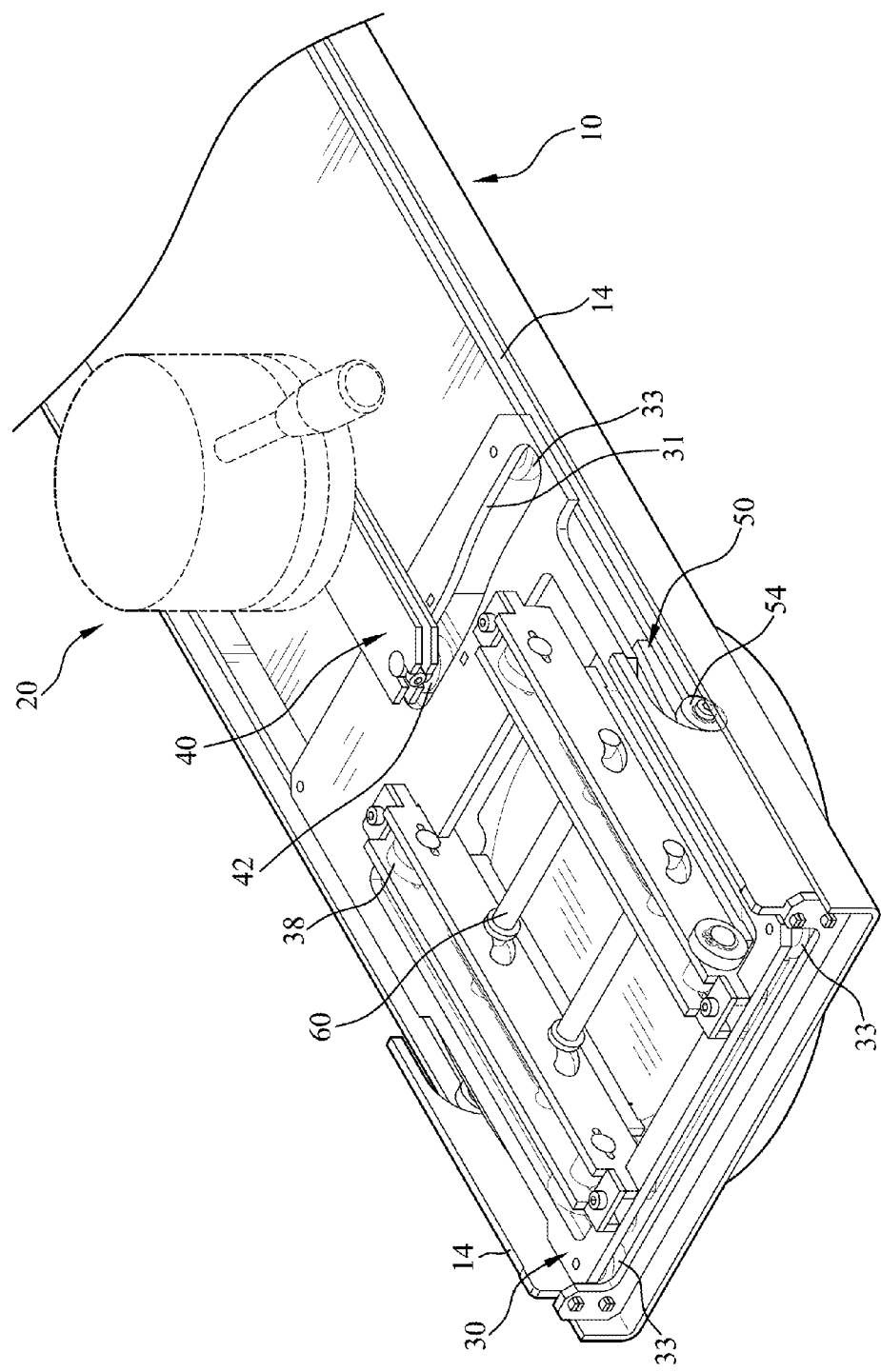
FIG. 3 is an internal schematic view illustrating the sliding seat at the second end in accordance with the present invention.

Referring to FIG. 8C, when the rolling member 42 of the swing arm 40 moves to the third driving section 323 (as shown in FIG. 3), the circular rod 60 is placed in the second end 372 of the connecting groove 37 and the first end 531 of the matching groove 53, such that the sliding seat 30 remains in a stop status again, whereby the valve member 50 stably seal the valve opening 13.

Figure 9B:
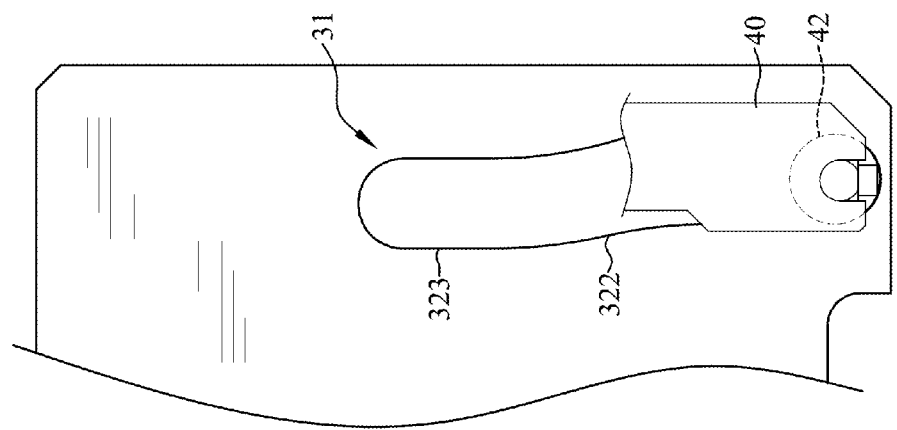
FIG. 9A to FIG. 9D are schematic views illustrating different positions of the swing arm in relation to the driving groove in accordance with the present invention.
Figure 9A:
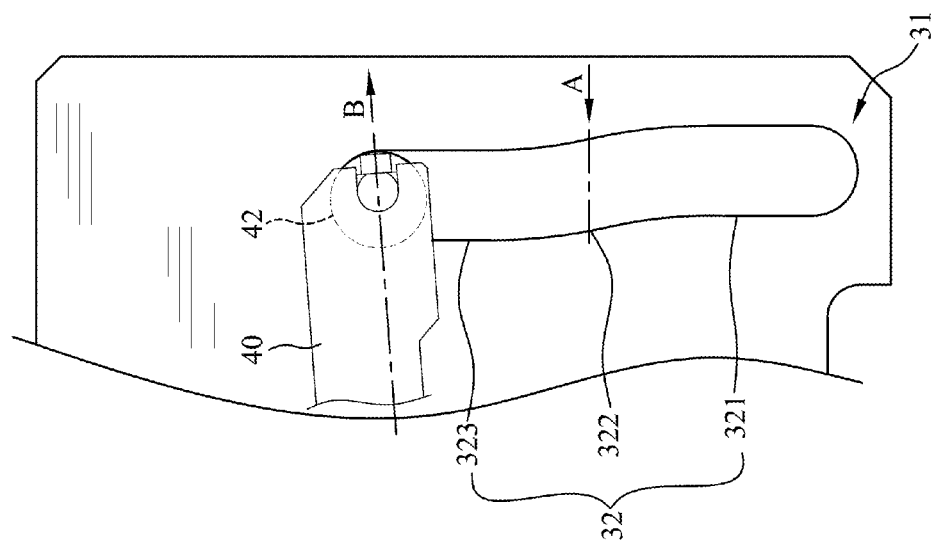
Figure 9D:
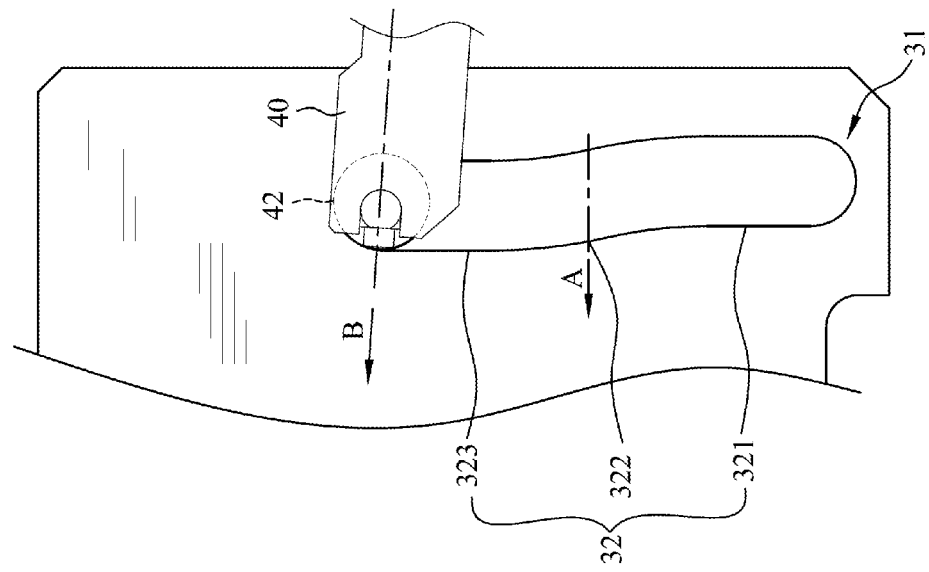
Figure 9C:
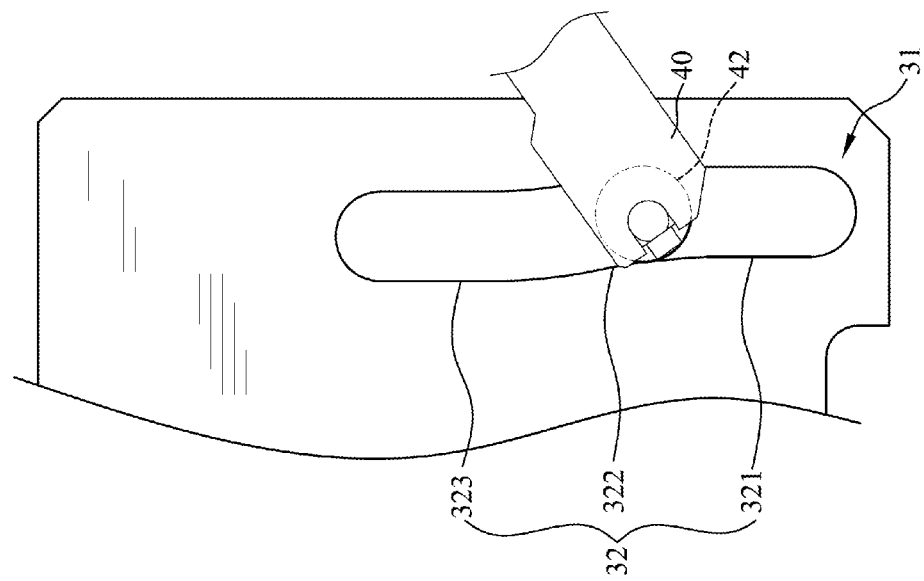

FIG. 9A, FIG. 9B, and FIG. 9C illustrate the swing arm 40 placed at different positions against the driving groove 31. Referring to FIG. 9A, the swing arm 40 is at the first position, and the rolling member 42 is in the end part of the third driving section 323. Meanwhile, the sliding seat 30 is placed at the first end 11 of the main body, as shown in FIG. 1 and FIG. 2.

Referring to 9B, the swing arm 40 is driven to move along the driving track 32 of the driving groove 31 to the end part of the first driving section 321.

Referring to FIG. 9C, the rolling member 42 of the swing arm 40 moves from the first driving section 321 to the second driving section 322. Meanwhile, the sliding seat 30 moves close to the second end 12 of the main body 10, such that the guiding roller 54 enters the curved portion 151 of the positioning groove 15, whereby the valve member 50 vertically moves toward the valve opening 13 to seal the valve opening 13. When the guiding roller 54 enters the distal portion 152 of the positioning groove 15, the valve member 50 stably and tightly seal the valve opening 13, as shown in FIG. 5.

Referring to FIG. 9D, the swing arm 40 is at the second position, and the rolling member 42 is in the end part of the third driving section 323 again. When the swing arm 40 is at either the first position or the second position, position of the swing arm 40 is biased against the route direction of the sliding seat 30. Thus, the sliding seat 30 is prevented from swaying, whereby the valve member 50 seals the valve opening 13 much effectively when the swing arm 40 is at the second position, so as to prevent the sliding seat 30 from being imposed with lateral force. Therefore, the sealing effect between the valve member 50 and the valve opening 13 is assured.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A gate valve with secure sealing mechanism, comprising:
    a main body, provided with a first end and a second end, with the second end having a valve opening;
    a driver, disposed on the main body;
    a sliding seat, slidingly disposed in the main body and transversely provided with a driving groove, while the driving groove defines a non-linear driving track;
    a swing arm, with one end thereof connected to the driver and the other end thereof disposed in the driving groove, such that the driver drives the swing arm to circularly move along the driving track between a first position and a second position, so as to triggers the sliding seat to slide between the first end and the second end, wherein when the swing arm is at the first position and the second position, the swing arm is biased against a route direction of the sliding seat; and
    a valve member, disposed on the sliding seat for moving in parallel or vertical to the valve opening,
    such that the sliding seat is at the first end when the swing arm is at the first position, and the sliding seat is at the second end when the swing arm is at the second position, whereby the valve member stably seals the valve opening.

2. The gate valve of claim 1, wherein the driver is rotatable disposed on the main body and operated manually.

3. The gate valve of claim 1, wherein the driver comprises a fixing portion externally fixed on the main body; an acting portion rotatable disposed on the fixing portion; a rotary shaft longitudinally disposed between the acting portion and the fixing portion, with one end of the rotary shaft connected to the swing arm; an operation rod passing through the acting portion and the rotary shaft for driving the rotary shaft to rotate.

4. The gate valve of claim 3, wherein one end of the swing arm is provided with an engaging hole, while one end of the rotary shaft is provided with a block for being engaged with the engaging hole.

5. The gate valve of claim 4, further comprising a fastening member transversely fastened to the engaging hole and the block.

6. The gate valve of claim 1, wherein one end of the swing arm is provided with a rolling member which is placed in the driving groove.

7. The gate valve of claim 6, wherein the driving groove comprises a first driving section, a second driving section, and a third driving section, while the second driving section inclinedly connected between the first driving section and the third driving section, such that when the rolling member moves from the first driving section to the second driving section, the valve member vertically moves toward the valve opening for sealing the valve opening.

8. The gate valve of claim 7, wherein when the swing arm is at the first position and the second position, the rolling member is positioned at an end part of the third driving section.

9. The gate valve of claim 1, wherein the sliding seat is fixedly provided with two parallel first guiding portions, and the valve member is provided with two second guiding portions coupled with the first guiding portions, such that the valve member is allowed to move in vertical to the valve opening for sealing the valve opening.

10. The gate valve of claim 9, wherein two sides of the inner edge of the main body are provided with a guiding plank, respectively, and two sides of the valve member are correspondingly provided with a guiding roller, respectively, for rollingly contacting the corresponding guiding plank.

11. The gate valve of claim 10, wherein a positioning groove is disposed on each of the guiding planks adjacent to the valve opening, respectively, and the positioning groove is provided with a curved portion and a distal portion, such that when the guiding wheel moves from the curved portion to the distal portion, the valve member seals the valve opening.

12. The gate valve of claim 9, wherein the first guiding portion is provided with two symmetric connecting grooves, and the second guiding portion is provided with two symmetric matching grooves reversely disposed in relation to the connecting grooves, with at least one circular rod passing through each of the connecting grooves and the matching grooves, respectively, such that each of the connecting grooves overlaps and cooperates with each of the matching grooves, respectively.

13. The gate valve of claim 12, wherein the shape of the connecting groove is substantially identical with the shape of the matching groove.

14. The gate valve of claim 13, wherein the connecting groove and the matching groove are provided with a first end and a second end, respectively, with a bias section disposed between the first end and the second end.

15. The gate valve of claim 12, wherein the first guiding portion is formed of two parallel first planks with a certain spacing therebetween, and the second guiding portion is formed of two parallel second planks with a certain spacing therebetween, while the two second planks are sandwiched by the two first planks, with a linkage plank disposed between the two second planks, such that movement of each of the circular rods are synchronized.

16. The gate valve of claim 10, wherein four corners of the sliding seat is provided with a first roller, respectively, for rollingly contacting the inner lateral sides of the two guiding plank.

17. The gate valve of claim 1, wherein the sliding seat is provided with plural second rollers for rollingly contacting the inner face of the main body on one side in opposite to the valve opening.

18. The gate valve of claim 1, wherein one end of the sliding seat adjacent to the driving groove is provided with a guiding wheel for contacting the inner face of the main body on one side provided with the valve opening.

* * * * *